Feb. 20, 1945. O. A. ULLRICH, JR 2,369,764
APPARATUS FOR FORMING OPTICAL WEDGES
Filed Sept. 30, 1943 2 Sheets-Sheet 2

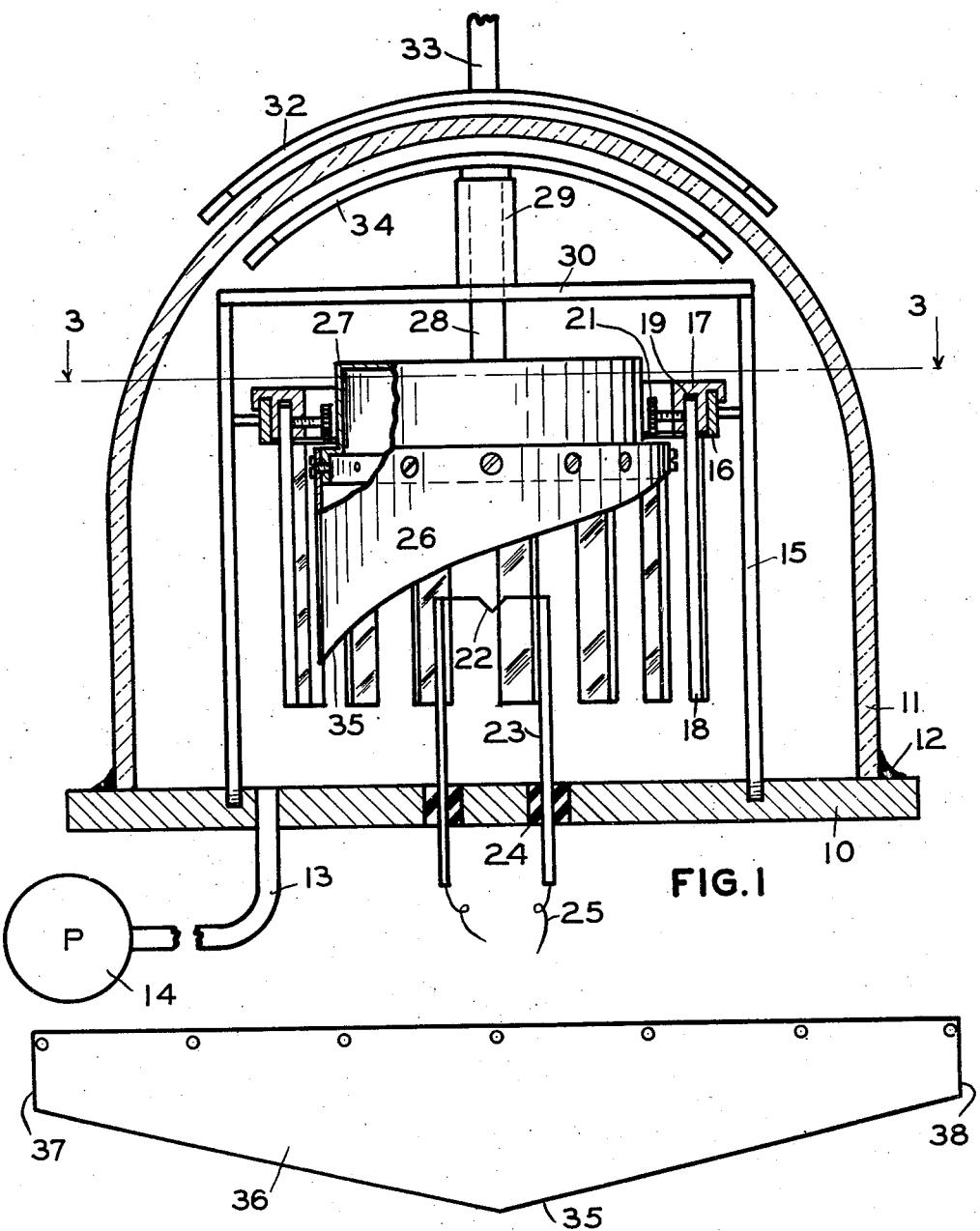

OSMAR A. ULLRICH JR.
INVENTOR

Patented Feb. 20, 1945

2,369,764

UNITED STATES PATENT OFFICE 2,369,764

APPARATUS FOR FORMING OPTICAL WEDGES

Osmar A. Ullrich, Jr., Rochester, N. Y., assignor to Bausch & Lomb Optical Company, Rochester, N. Y., a corporation of New York Application September 30, 1943, Serial No. 504,396

9 Claims. (Cl. 91—12.2)

This invention relates to apparatus for forming optical wedges.

Each optical wedge of the present invention comprises a body of a transparent material such as glass having on at least one face thereof a thin film having a varied thickness of a distilled material. The film may be semi-transparent even at the maximum thickness so that the optical density of the film will vary from the minimum thickness to the maximum. The material from which the film is formed preferably should be one which is substantially neutral when viewed by transmitted light and the wedges may be used in any optical instrument in which it is desired to vary the intensity of a bundle of light rays.

The film is preferably deposited by a high vacuum thermal evaporation process, the film forming material being vaporized in an evacuated container in which a plurality of the film receiving bodies are mounted. In the form of the apparatus now preferred, the film receiving bodies are disposed about the material being evaporated so as to be equally spaced therefrom and a mask or blocking element is moved during the evaporation cycle intermediate the material being vaporized and the film receiving bodies.

The mask in the broader aspects of the present invention comprises a tubular member mounted for rotation about an axis parallel with the longitudinal axes of the film receiving bodies. The tubular member is formed with an opening of such a shape that a defining edge thereof as the tubular member is rotated moves longitudinally of each film receiving body to progressively uncover the face thereof. This progressive movement of the edge exposes different areas of each face for varying intervals of time to the vapors emanating from the material being vaporized. Thus, varying quantities of the vapors are permitted to condense on the different areas to form a film of distilled material of varying thickness.

The film deposited on the face of each body will depend on the shape of the opening in the tubular member, the position of the film receiving bodies relative to the tubular member and the disposition of its rotational axis relative to the longitudinal axis thereof as well as the position of the source of vaporizing material. These factors may be adjusted to bring about any desired film on the face of each body. A feature of the present invention, therefore, is the ability to form one or more optical wedges each comprising a transparent body having on at least one face thereof a film of distilled material having a controlled graduated thickness.

To eliminate unavoidable variations in the rate at which the film forming material is vaporized and condenses on the faces of the bodies, it is now preferred to rotate the tubular member a multiplicity of times relative to the body during the vaporizing cycle of the method of the present invention. This insures that the change in the thickness of the resulting film will be independent of the rate of evaporation of the material.

Other features and advantages of the present invention will be apparent from the following description taken in connection with the accompanying drawings in which:

Fig. 1 is a sectional view partly in elevation of the apparatus of the present invention.

Fig. 2 is a top plan view showing the element from which the mask of the illustrated form of the invention is developed.

Figure 3:
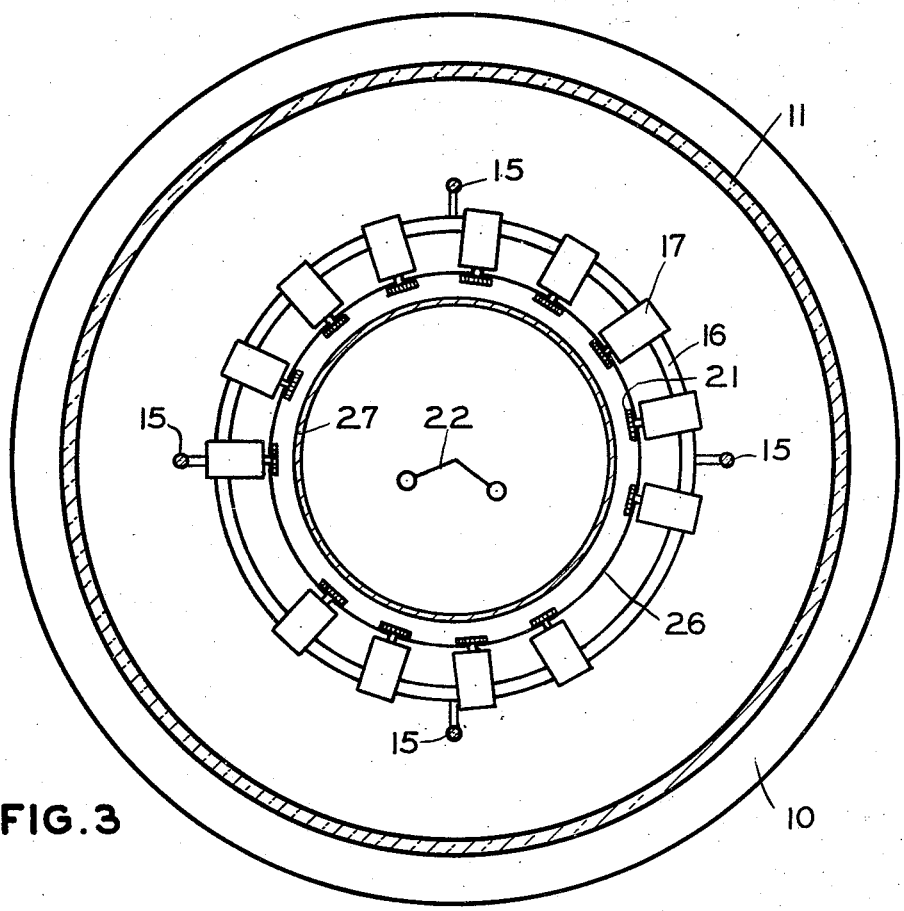
Fig. 3 is a section taken along line 3—3 of Fig. 1.

The apparatus of the present invention referring now to the drawings comprises a suitable base plate 10 which supports an evacuable container shown here as a bell jar 11 of glass or other material. A vacuum tight seal is formed between the lower edge of the bell jar 11 and the base plate 10 by any suitable sealing means 12. The bell jar is connected by some conventional means such as the pipe 13 to a high vacuum pump, shown here diagrammatically at 14.

A plurality of stanchions 15, vertically extending upwardly from the base plate 10, support above the same an annular member 16 which forms a carrier for a holding member 17 in which are mounted the transparent bodies 18 which are to receive the film. Each carrier member 17 is provided with a race or channel for receiving the annular supporting member 16 and a groove 19 for receiving one end of the transparent body 18. The end of the body 18 is held in the groove 19 by a clamping screw 21. It will thus be seen that the transparent body 18 shown herein as rectangular pieces are pendently supported from the member 16.

In the illustrated form of the present invention the vaporizable material is held by a heating element 22 suspended between and connected to current conducting posts 23 supported by bushings 24 of insulating material fitted into apertures formed in the base plate 10. The heating element 22 is connected to a suitable source of current, not illustrated in the drawings, through the current conducting posts 23 and lead-in conductors 25. It should be noted that the heating element 22 is so supported above the base plate that it is equally spaced from all of the glass plates 18 carried by the annular member 16.

It has been found that vapor from a point source of vaporizing material in an evacuated chamber will travel in substantially straight lines outwardly from the source of material. However, in the illustrated form of the apparatus, as all portions of the faces of the plates 18 to be filmed are not equally distant from the source of material, a film resulting from the deposition of vapor thereon will not be equal in thickness over the entire area of each face as the thickness will vary inversely as the square of the distance between the source and any area of the face. Another factor influencing the thickness of the film deposited is the angular relationship between the normal at any point on a face of a plate and the path of travel of the vapor impinging on the face at that point. The thickness of the film at any point will vary as $t_o \cos e$, where $t_o$ is the thickness at the point where the path of travel is normal to the face and $e$ is the angle between the normal to the face and the path of travel of the vapor. Therefore, some gradation in thickness of film along the face would result but the gradation would not be uniform, that is, the change in thickness would not be directly proportional to the distance along the face. Furthermore, it would be impossible to practically control the relationship between the maximum thickness and the length of the filmed area.

To effectively obtain the desired controlled graduations in the the thickness of the deposited film, it is preferred to use a mask or blocking element between the source of material and the faces of the plates 18 to receive the distilled material. The mask or blocking element may comprise any means desired for controlling the passage of vapor particles to the faces of the plates and in the illustrated embodiment of the invention this means comprises a vertically disposed cylindrical tube 26 removably secured to a carrying element 27 fixed to the lower end of a shaft 28. The shaft 28 is supported in a bearing 29 carried by a spider member 30 suspended between the stanchions 15. The axis of rotation of the shaft 28 is coincident with the longitudinal axis of the tube 26 which is parallel to the longitudinal axes of the plates, and passes through the source of material held by the filament 22. As the tube 26 has a diameter less than the distance between any two diametrically opposed plates 18, it will be seen that the wall of the tube 26 is disposed between the source of material to be vaporized and the faces of the plates 18.

Although any means desired may be used for rotating the mask 26, in the form of the invention now preferred, the mask 26 is rotated through a magnet 32 carried by a shaft 33, rotated by some suitable means such as a gear and motor not illustrated in the drawings. A second magnet 34, or some mass of magnetizable material, is fixed to the upper end of the shaft 28 on which the mask 26 is mounted. It will be seen that the magnet 34, due to the magnetic attraction between the same and the magnet 32 will rotate with the latter when the shaft 33 is rotated and that the shaft 28 to which the mask is fixed will rotate at the same speed that the shaft 33 is rotated.

The lower edge 35 of the mask 26, in the form of the invention now preferred, is cut off so that the end face thereof defines a surface which is angularly disposed relative to the axis of the mask. It will be seen that in effect, the wall of the tube 26 is formed with an opening so disposed relative to the source of material heated by the filament 32 the vapor therefrom may pass through the opening and condense on the faces of the plates 18 as the tube or mask is rotated. The defining edge 35 of the opening is of such a shape that, when the mask is rotated, the edge 35 moves longitudinally of each plate to progressively uncover the face thereof adjacent mask. This progressive movement of the edge 35 exposes different areas of each face for varying intervals of time to the vapor emanating from the material being vaporized by the heat in the filament.

As different areas of a face of each plate will be exposed for varying intervals of time to the vapor, the film formed on each face as a result of the vaporized material condensing thereon will vary in thickness. It will now be understood that the film formed on each of the plates 18 will have a maximum thickness at the lower end thereof as viewed in Fig. 1, and a minimum thickness at the end of each of the plates adjacent to support 16.

Although a film of varying thickness would be deposited on each face of the plate 18 after one complete revolution of the mask 26, as the rate at which film forming materials vaporize is not uniform, it is now preferred to repeatedly rotate the mask relative to the plates during the vaporization cycle of the process. This insures that the change in the thickness of the resulting film will be substantially independent of the rate of evaporation of the material.

The shape of the edge 35 of the opening formed in the mask 26 will, as should now be understood, largely determine the gradation of the film deposited on the faces of the plates 18. Thus, the particular light wedge desired will in part determine the shape of the edge 35 of the mask and the disposition of the same relative to the source. As the optical properties of the film forming material vary at different thicknesses, the material used will also to some extent determine the shape of the edge 35.

Although any vaporizable material can be used to form the film, depending upon the use to which the resulting light wedge is to be put, I have found that the alloy sold under the trade name "Inconel" is excellent, as a semi-transparent film formed of this alloy is substantially neutral when viewed by transmitted light. This alloy comprises substantially 79.5% nickel, 13% chromium, and 6.5% iron. Furthermore, the optical density of a film formed of this alloy varies almost in direct proportion to the thickness of the film. It is, therefore, possible to form a wedge of this alloy, the optical density of which will vary substantially in direct proportion to the distance along each plate by causing to be deposited on the plate a film of evenly graduated thickness. Such a wedge will be accurate enough for many applications and can be produced by forming the edge 35 as a helix or a series of helical portions.

In the illustrated embodiment of the present invention, the edge 35 is formed with oppositely directed helical portions having a common origin and equal helical angles. Such an edge can be formed by merely rolling up a strip 36 of suitable material such as sheet aluminum having a shape as shown in Fig. 2 and securing the opposite edges 37 and 38 of the strip together by any means desired.

Figure 4:
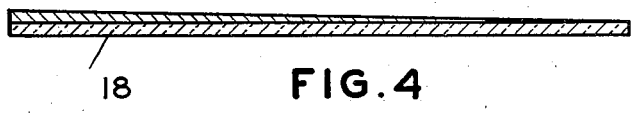
Fig. 4 is a longitudinal sectional view of a wedge formed by the apparatus of the present invention.

In operation of the present invention, after the plates 18 have been fixed in the carrier members and the latter members secured to the annular support 16 and the film forming material deposited on the filament 22 or supported in some manner in heat receiving relationship therewith, the bell jar 11 is evacuated. When the pressure within the bell jar 11 has reached the desired minimum, the mask 26 is rotated through rotation of the magnet 32, and the filament 22 is energized to heat the same to a temperature necessary to cause the film forming material to evaporate. Rotation of the mask 26 will produce some graduation in the thickness of the film deposited on the faces of the plates 18 dependent on the shape of the edge 35. After the film forming material has been evaporated, the bell jar can be removed from the base plate and the filmed plates 18 removed from the support 16. It will be noted that the portion of each plate 18 received within the carrier member 17 and a small portion of the area of the face exposed adjacent to support 16 will not receive any vapor from the source of material. This unfilmed portion may be cut off of the plate 18 to form a wedge as shown in Fig. 4, or the same may be left intact and the unfilmed area of the plate used as a convenient handle for handling the wedge.

Although the edge 35 if given in the shape just described, will cause a film to be deposited, the thickness of which varies in direct proportion to the distance along the plate, the optical density of this wedge will not vary as the thickness for, as above mentioned, the optical density of the alloy "Inconel" is not a linear function of the thickness of the resulting film.

Should a wedge be desired whose optical density will vary precisely in direct proportion to the distance along the wedge, the shape of the edge 35 must be corrected for the variations in thickness due to the varying distances between the source and different areas on the plate, and the difference in the angles at which the vapor particles strike different areas of the plate, as well as the inherent optical properties of the film forming material.

It should be obvious now that any gradation in the film can be obtained by merely changing the shape of the edge 35 of the mask 26 and the disposition of the mask relative to the source and the plates to be filmed. It should, therefore, be understood that while the present preferred embodiment of the invention has been illustrated and described herein, the invention is not to be limited thereby but is susceptible to changes in form and detail within the scope of the appended claims.

I claim:

1. In an apparatus of the type described, an evacuable container; means for evacuating said container; means for vaporizing a source of film-forming material within said container; means mounted within said container for holding at least one film-receiving member with a surface thereof facing said vaporizing means; a hollow cylindrical mask mounted within said container for rotation about an axis parallel with the longitudinal axis of said surface of the member, the lower edge of said cylindrical mask being so formed that it uncovers a part of the surface of said member for a time longer than another part of the surface whereby a film having a graduated thickness is formed by condensed vaporized material on said surface; and means for rotating the mask.

2. In an apparatus of the type described, an evacuable container; means for evacuating said container; means within said container for vaporizing a source of film-forming material; means for holding an elongate plate with one face thereof adjacent said vaporizing means; a shield comprising a tube mounted for rotation about an axis parallel to the longitudinal axis of the said face of the plate, said tube having an opening therein so shaped that one defining edge thereof moves longitudinally of the face of said plate upon rotation of said tube whereby different areas of said face are exposed to the vaporized material for different intervals of time; and means for rotating said tube.

3. In an apparatus of the type described, an evacuable container; means for evacuating the same; means for vaporizing a source of film-forming material; means for holding a plurality of elongated plates vertically in said container and circumscribing said vaporizing means; a shield, said shield comprising a cylindrical tube truncated with a warped surface angularly disposed to the axis of the tube; means for mounting said tube for rotation about a vertical axis coincident with the longitudinal axis of the same, said tube having a diameter less than the distance between any two diametrically opposed plates whereby the wall thereof moves in a circular path intermediate said vaporizing means and the adjacent faces of said plates; and means for rotating the tube.

4. In an apparatus of the type described, an evacuable container; means for evacuating the same; a cylindrical tube mounted for rotation about the longitudinal axis thereof; means disposed on said axis for vaporizing a source of film-forming material; means for holding a plurality of plates about said tube, one face of each plate being substantially parallel to the longitudinal axis of said tube, the lower wall portion of said tube being shaped to expose part of the face of each plate to the vaporized material for a longer time than another part of said face during each rotation of said tube whereby the variable quantity of vaporized material impinging on each face of said plate forms thereon a film of distilled material having a variable thickness; and means for rotating said tube.

5. In an apparatus of the type described, an evacuable container; means for evacuating the same; means within said container for vaporizing a source of film-forming material; means for holding a plurality of vertically disposed elongate plates circumscribing said vaporizing means; a tubular member having an opening therein at least a part of the defining edge of which is a helix; means for mounting said tubular member for rotation whereby the opening moves in a circular path about said vaporizing means, the helical defining edge of said opening progressively uncovering each plate a multiplicity of times during the evaporation cycle whereby a variable quantity of vaporized material passes through said opening and impinges on each face of said plate to form thereon a film of distilled material having a variable thickness; and means for rotating said tubular member.

6. In an apparatus of the type described, an evacuable container; means for evacuating the same; a cylindrical tube mounted for rotation within said container about the longitudinal axis thereof; means for rotating said tube; means adjacent the lower edge of said tube and disposed on said axis for vaporizing a source of film-forming material; and means for holding a plurality of plates about said tube, one face of each plate being substantially parallel to said axis, the lower edge of said tube being formed as a helical portion so that the lower wall portion of said tube at each rotation thereof blocks and unblocks the path of travel of the vaporized material toward said faces whereby the variable quantity of vaporized material impinging on each face forms thereon a film of distilled material having a variable thickness.

7. In an apparatus of the type described, an evacuable container; means for evacuating the same; means within said container for vaporizing a source of film-forming material; an annular support within said container concentrically mounted relative to said vaporizing means; means for dependingly supporting a plurality of plates from said annular support; a mask mounted to move in a circular path intermediate the vaporizing means and the faces of the said plates adjacent said vaporizing means, said mask comprising the wall of a cylindrical tube having the lower edge thereof formed as two oppositely directed helical portions having a common origin and terminus, said mask varying the quantity of the vaporized material traveling toward and condensing on different areas of said faces whereby the variable quantity of vaporizing material impinging on each face forms thereon a film of distilled material having a variable thickness; and means for moving the mask.

8. In an apparatus of a type described, an evacuable container; means for evacuating the same; means within said container for vaporizing a source of film-forming material; means for holding a plurality of elongate plates vertically in said container and circumscribing said vaporizing means; a tubular member having an opening therein at least a part of the defining edge of which is a helix; and means for rotating said tubular member, said tubular member having a diameter such that the wall thereof moves in a path intermediate said source and said plates, the helical defining edge of said opening progressively uncovering each plate a multiplicity of times as the member is successively rotated during the evaporation cycle so that variable amounts of said vaporized material passes through said opening and condenses on different areas of each face to cause a film of distilled material having a variable thickness to be deposited on said face.

9. In an apparatus of the type described, an evacuable container; means for evacuating the same; means within said container for vaporizing a source of film-forming material; means for holding a plurality of elongate plates vertically in said container in such a manner that one face of each plate is spaced the same distance from said source as the faces of the remaining plates; a tubular member having an opening therein; means for mounting said tubular member for rotation about an axis parallel to the film receiving faces of said plates; and means for rotating said tubular member, the wall of said tubular member moving between said vaporizing means and said plate and the opening therein being so shaped that the one defining edge thereof progressively uncovers and covers each plate a multiplicity of times as the member is successively rotated during the evaporation process so that variable quantities of vaporized material impinges on each face and forms thereon a film of distilled material having a variable thickness.

OSMAR A. ULLRICH, Jr.